(12) United States Patent
Chen (10) Patent No.: US 8,094,235 B2
(45) Date of Patent: Jan. 10, 2012

(54) IMAGE SIGNAL PROCESSING METHOD FOR DE-INTERLACING BASED ON OFFSET PROCESSING

(75) Inventor: Chien-Chou Chen, Taipei County (TW)

(73) Assignee: AmTran Technology Co., Ltd., Jhonghe, Taipei County (TW)

( * ) Notice: Subject to any disclaimer, the term of this patent is extended or adjusted under 35 U.S.C. 154(b) by 629 days.

(21) Appl. No.: 12/272,795

(22) Filed: Nov. 18, 2008

(65) Prior Publication Data

US 2010/0045861 A1 Feb. 25, 2010

(30) Foreign Application Priority Data

Aug. 22, 2008 (TW) ................................ 97132072 A (51) Int. Cl.
*H04N 11/20* (2006.01)

(52) U.S. Cl. ........ 348/452; 348/135; 348/448; 348/459; 348/672; 375/240.26

(58) Field of Classification Search .................. 348/135, 348/448, 452, 459, 672; 375/240.26
See application file for complete search history.

(56) References Cited

U.S. PATENT DOCUMENTS

| | | | |
|---|---|---|---|
| 7,075,581 B1 * | 7/2006 | Ozgen et al. | 348/448 |
| 7,242,435 B2 * | 7/2007 | Lin et al. | 348/448 |
| 2005/0168653 A1 * | 8/2005 | Wyman | 348/700 |
| 2007/0030384 A1 * | 2/2007 | Wredenhagen et al. | 348/449 |
| 2007/0052846 A1 * | 3/2007 | Adams | 348/452 |
| 2007/0140357 A1 * | 6/2007 | Montgomery | 375/240.26 |
| 2007/0296870 A1 * | 12/2007 | Foret | 348/701 |
| 2008/0118163 A1 * | 5/2008 | Chang et al. | 382/236 |
| 2008/0122973 A1 * | 5/2008 | Iwasaki et al. | 348/448 |
| 2008/0151101 A1 * | 6/2008 | Tian et al. | 348/448 |
| 2008/0231748 A1 * | 9/2008 | Su et al. | 348/452 |
| 2009/0115845 A1 * | 5/2009 | Walls et al. | 348/135 |
| 2009/0238471 A1 * | 9/2009 | Alelyunas | 382/218 |
| 2010/0246992 A1 * | 9/2010 | Kempf et al. | 382/262 |

* cited by examiner

*Primary Examiner* — Jefferey Harold
*Assistant Examiner* — Sam Huang
(74) *Attorney, Agent, or Firm* — Winston Hsu; Scott Margo (57) ABSTRACT

An image signal processing method is disclosed for maintaining high image display quality by avoiding signal-mode misjudgment. The image signal processing method includes generating a first threshold based on a plurality of motion values generated prior to a first time when an image input signal is detected to be of a film mode, generating a second threshold based on the first threshold and a first offset, generating a third threshold based on the first threshold and a second offset, and determining whether the image input signal between the first time and a second time is the film mode or a video mode based on the second and third thresholds.

11 Claims, 6 Drawing Sheets

IMAGE SIGNAL PROCESSING METHOD FOR DE-INTERLACING BASED ON OFFSET PROCESSING

CROSS REFERENCE TO RELATED APPLICATIONS

This application claims the benefit of priority under 35U.S.C. §119(a) of Taiwan Patent Application No. 097132072, filed on Aug. 22, 2008.

BACKGROUND OF THE INVENTION

1. Field of the Invention

The present invention relates to an image signal processing method, and more particularly, to an image signal processing method based on an offset processing mechanism.

2. Description of the Prior Art

The image signal of a television can be a video-mode signal or a film-mode signal. Based on the video standards created by the National Television Standards Committee (NTSC), the image signal is displayed on a television with a speed of 60 frames per second. However, a speed of 24 frames per second is normally applied to generate a camera signal while shooting a film. That is, when the camera signal is played on a television, the camera signal having 24 frames per second should be converted into a film-mode signal having 60 fields per second by a 3:2 pull-down technology so as to comply with the NTSC video standards.

Figure 1:
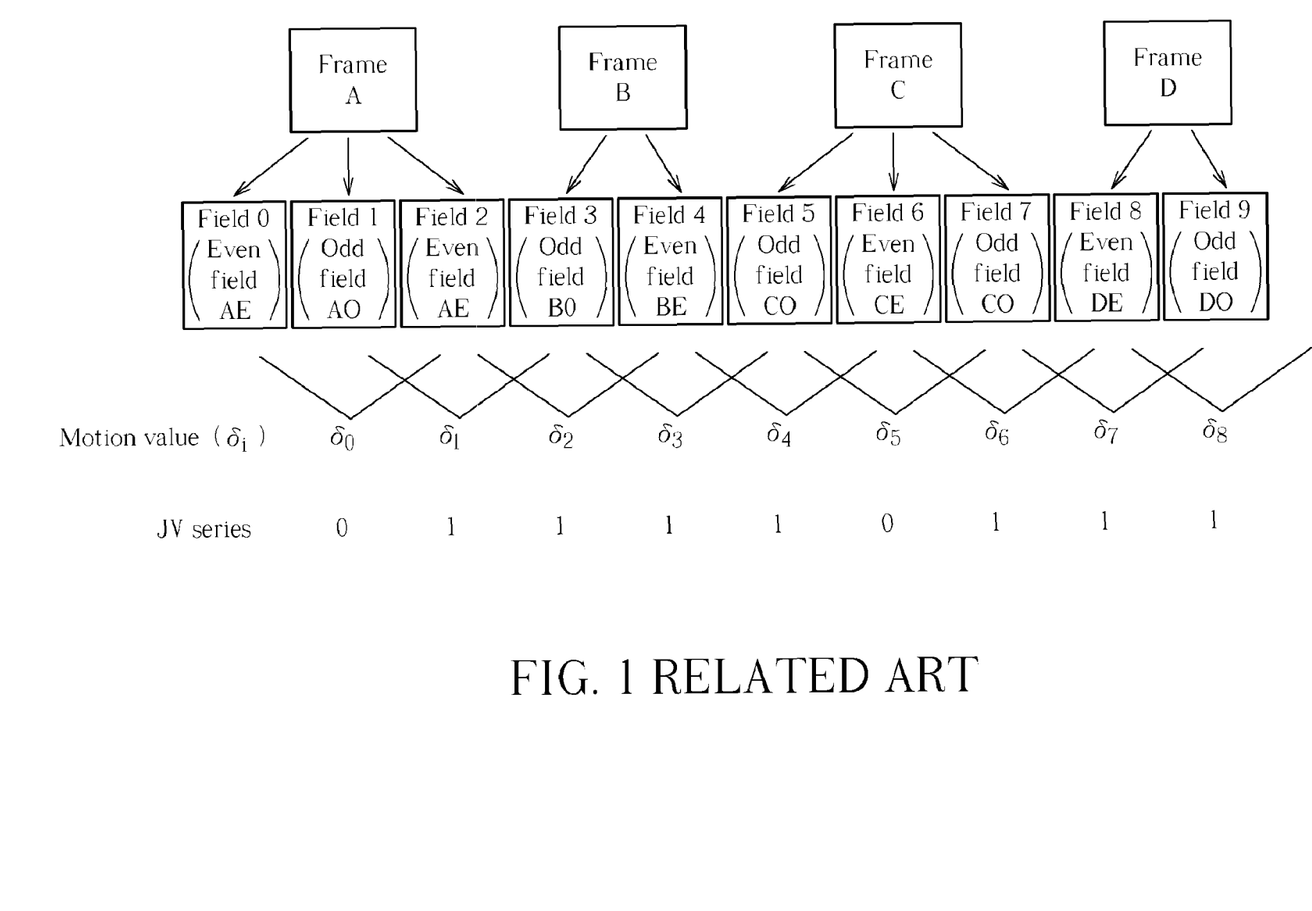
FIG. 1 is a schematic diagram showing an operation for converting frames into fields based on the 3:2 pull-down technology.

Please refer to FIG. 1, which is a schematic diagram showing an operation for converting frames into fields based on the 3:2 pull-down technology. As shown in FIG. 1, a frame A is dismantled to generate a field 0 (even field AE), a field 1 (odd field AO) and a field 2 (even field AE), a frame B is dismantled to generate a field 3 (even field BO) and a field 4 (even field BE), and so on, for converting a camera signal having 24 frames per second into a film-mode signal having 60 fields per second.

When an image input signal such as a video-mode signal or a film-mode signal, having 60 fields per second, is forwarded to be displayed on a television, the image input signal should be de-interlaced for generating an image output signal having 60 frames per second in advance, and then the generated frames are sequentially displayed. However, the method for de-interlacing a video-mode signal is different from the method for de-interlacing a film-mode signal. Consequently, while displaying an image input signal, the image input signal should be first identified as a video-mode signal or a film-mode signal so as to apply a proper method for de-interlacing the image input signal. In other words, if an improper method is applied to de-interlace the image input signal due to a signal-mode misjudgment of the image input signal, the image display quality will be degraded significantly.

In order to identify the signal mode of an image input signal, a plurality of motion values $\delta_i$ are first calculated, and then the plurality of motion values $\delta_i$ are compared with a preset threshold for generating a plurality of field variation judge values, which are referred to as JV values hereinafter. The plurality of JV values develop to be a field variation judge value series, which is referred to as a JV series hereinafter. When a motion value $\delta_i$ is greater than the preset threshold, the corresponding JV value is 1. Alternatively, when a motion value $\delta_i$ is not greater than the preset threshold, the corresponding JV value is 0. That is, the JV value having a value of 0 means that the ith field and the (i+2)th field for generating the corresponding motion value $\delta_i$ are substantially identical fields.

Please continue referring to FIG. 1. When the image input signal is a film-mode signal, the motion value $\delta_0$, calculated based on a field 0 and a field 2, is not greater than the preset threshold in that both the field 0 and the field 1 are the even field AE of the frame A, and therefore the corresponding JV value is 0. Similarly, the motion value $\delta_5$, calculated based on the field 5 and field 7, is not greater than the preset threshold in that both the field 5 and the field 7 are the odd field CO of the frame C, and therefore the corresponding JV value is also 0. However, the motion values $\delta_1 \sim \delta_4$ and $\delta_6 \sim \delta_8$ are calculated based on different fields, and therefore the corresponding JV values are all 1. As shown in FIG. 1, the JV series, corresponding to the film-mode signal, is developed based on a periodical film-mode cadence sequence "01111" repeatedly. In view of that, the image input signal is identified as a film-mode signal when the periodical film-mode cadence sequence is detected.

Figure 2:
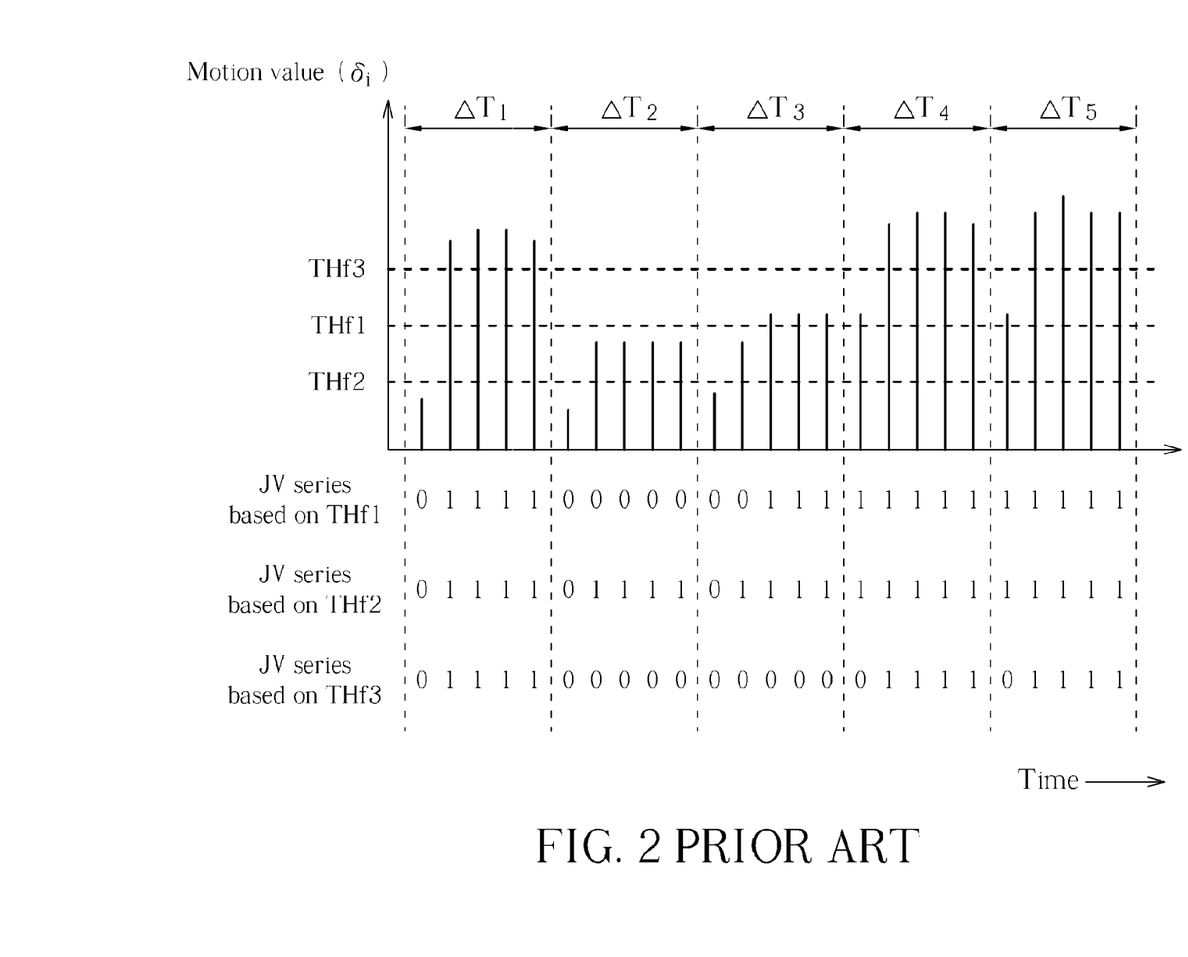
FIG. 2 is a schematic diagram showing a prior-art JV series generation method, having time along the abscissa.

Please refer to FIG. 2, which is a schematic diagram showing a prior-art JV series generation method, having time along the abscissa. In the prior-art JV series generation method, the motion values are compared with a fixed threshold for generating the JV series. All the motion values in FIG. 2 are corresponding to a film-mode signal, and therefore the JV series is supposed to comprise the periodical film-mode cadence sequences repeatedly. However, if the JV series is generated based on a fixed threshold THf1, errors occur to the JV series during the intervals $\Delta T_2$ and $\Delta T_3$ in that the motion values during the intervals $\Delta T_2$ and $\Delta T_3$ are relatively low and parts of the JV values are misjudged to be 0. Besides, errors also occur to the JV series during the intervals $\Delta T_4$ and $\Delta T_5$ in that the motion values during the intervals $\Delta T_4$ and $\Delta T_5$ are relatively high and parts of the JV values are misjudged to be 1. When parts of the JV values are generated incorrectly, the image input signal will be misidentified as a video-mode signal, and a method for de-interlacing a video-mode signal is applied to de-interlace the image input signal with film-mode, which results in a lower image display quality.

Alternatively, if the JV series is generated based on a lower fixed threshold THf2 for processing lower motion values, errors still occur to the JV series during the intervals $\Delta T_4$ and $\Delta T_5$ having high motion values. On the other hand, if the JV series is generated based on a higher fixed threshold THf3 for processing higher motion values, errors still occur to the JV series during the intervals $\Delta T_2$ and $\Delta T_3$ having low motion values. That is, while performing the prior-art JV series generation method based on a fixed threshold, parts of the JV values are likely to be generated incorrectly due to high motion value variation between different intervals, and an improper de-interlacing method may be applied to de-interlace the image input signal, which will degrade the image display quality significantly.

SUMMARY OF THE INVENTION

In accordance with an embodiment of the present invention, a method of image signal processing based on an offset processing mechanism is provided for maintaining a high image display quality by avoiding signal-mode misjudgment. The method comprises calculating a first threshold based on a first set of motion values, generated prior to a first time, corresponding to an image input signal when the image input signal is detected to be a film mode at the first time; generating a second threshold according to the first threshold and a first offset value; generating a third threshold according to the first threshold and a second offset value; and determining whether the image input signal between the first time and a second time is the film mode or a video mode based on the second threshold and the third threshold; wherein the second time is behind the first time.

The present invention further provides a method of film-mode detection based on an offset processing mechanism for maintaining a high image display quality by avoiding signal-mode misjudgment. The method comprises calculating a first set of motion values corresponding to an image input signal between a first time and a second time when the image input signal is detected to be a film mode at the first time; generating a first threshold according to a basic threshold and a first offset value; generating a second threshold according to the basic threshold and a second offset value; and determining whether the image input signal between the first time and a second time is the film mode based on the first threshold, the second threshold and the first set of motion values; wherein the second time is behind the first time.

These and other objectives of the present invention will no doubt become obvious to those of ordinary skill in the art after reading the following detailed description of the preferred embodiment that is illustrated in the various figures and drawings.

DETAILED DESCRIPTION

Hereinafter, preferred embodiments of the present invention will be described in detail with reference to the accompanying drawings. Here, it is to be noted that the present invention is not limited thereto. Furthermore, the step serial numbers concerning the image signal processing method are not meant thereto limit the operating sequence, and any rearrangement of the operating sequence for achieving same functionality is still within the spirit and scope of the invention.

Figure 3:
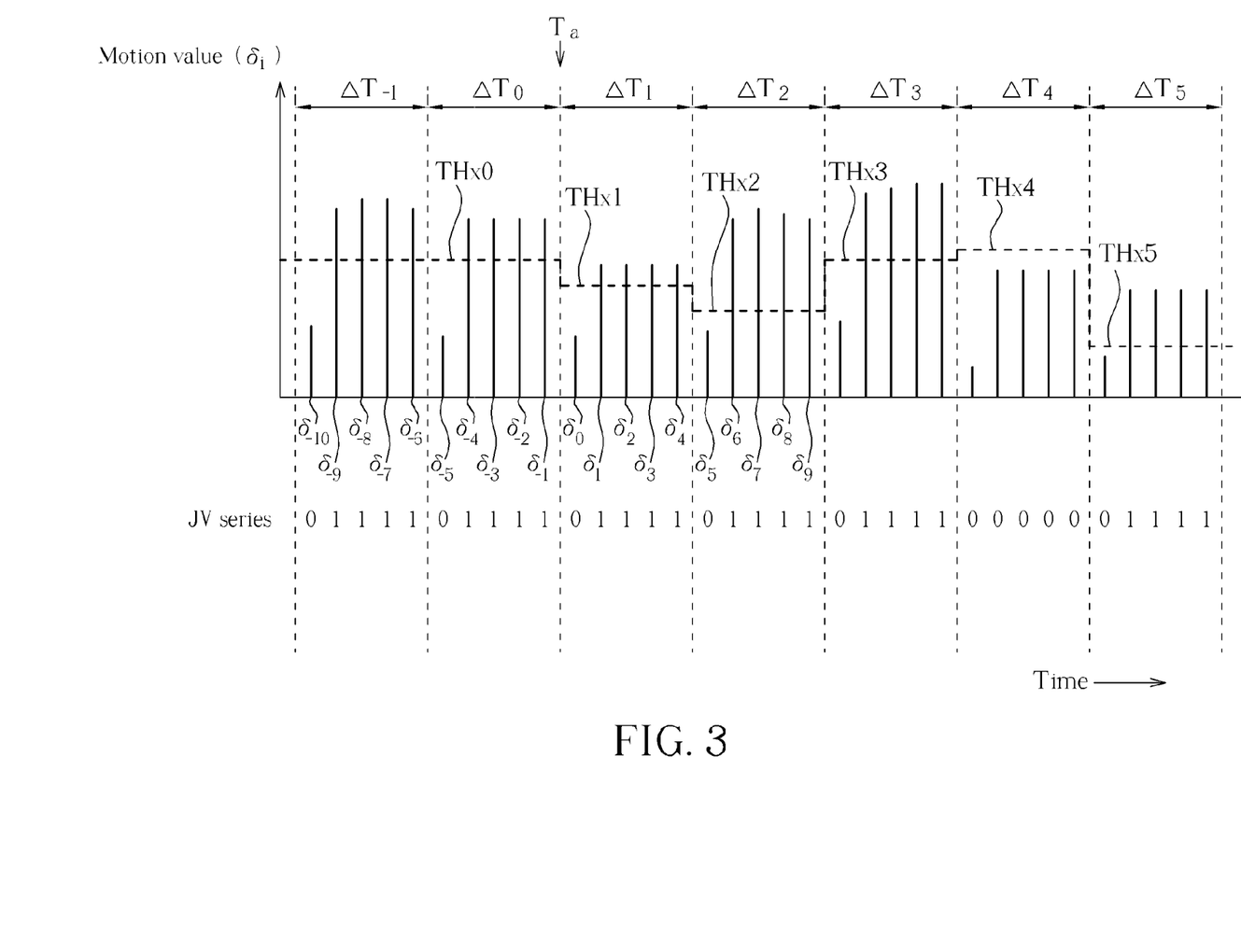
FIG. 3 is a schematic diagram showing a JV series generation method for use in a film-mode detection process in accordance with a first embodiment of the present invention, having time along the abscissa.

Please refer to FIG. 3, which is a schematic diagram showing a JV series generation method for use in a film-mode detection process in accordance with a first embodiment of the present invention, having time along the abscissa. A plurality of motion values shown in FIG. 3 are generated according to Formula (1) expressed below.

$$\delta_i = \sum_{j=1}^{N} (|R_i^j - R_{i+2}^j| + |G_i^j - G_{i+2}^j| + |B_i^j - B_{i+2}^j|) \quad \text{Formula (1)}$$

In Formula (1), $\delta_i$ represents an ith motion value, j represents the serial number of an image pixel in a field, N represents the number of image pixels in the field, $R_i^j$, $G_i^j$ and $B_i^j$ represent the red, green and blue pixel values respectively regarding the jth pixel in an ith field, and $R_{i+2}^j$, $G_{i+2}^j$ and $B_{i+2}^j$ represent the red, green and blue pixel values respectively regarding the jth pixel in a (i+2)th field.

All the motion values in FIG. 3 are corresponding to a film-mode signal, and therefore the JV series is supposed to comprise the periodical film-mode cadence sequence repeatedly. Before the image input signal is identified as a film-mode signal, i.e. prior to the time Ta, the JV series is generated based on a preliminary threshold THx0, e.g. during the intervals $\Delta T_0$ and $\Delta T_{-1}$. After the time Ta, i.e. after the image input signal is identified as a film-mode signal, the dynamic threshold used in each interval is generated based on a plurality of motion values corresponding to one preceding interval. For instance, the dynamic threshold THxN used in the interval $\Delta T_N$ can be generated according to Formula (2) expressed below.

$$THxN = \frac{\delta_{5N-10}}{2} + \frac{1}{8}(\delta_{5N-9} + \delta_{5N-8} + \delta_{5N-7} + \delta_{5N-6}) \quad \text{Formula (2)}$$

In Formula (2), N represents a positive integer, and $\delta_{5N-10} \sim \delta_{5N-6}$ represent a plurality of motion values corresponding to the preceding interval $\Delta T_{N-1}$. Accordingly, as shown in FIG. 3, a dynamic threshold THx1 is used in the interval $\Delta T_1$, a dynamic threshold THx2 is used in the interval $\Delta T_2$, and a dynamic threshold THx3 is used in the interval $\Delta T_3$, and so forth.

In another embodiment, after the image input signal is identified as a film-mode signal, the dynamic threshold used in each interval is generated based on a plurality of motion values corresponding to two preceding intervals. For instance, the dynamic threshold THxN used in the interval $\Delta T_N$ can be generated according to Formula (3) expressed below.

$$THxN = \frac{\delta_{5N-15}}{4} + \frac{1}{16}(\delta_{5N-14} + \delta_{5N-13} + \delta_{5N-12} + \delta_{5N-11}) + \frac{\delta_{5N-10}}{4} + \frac{1}{16}(\delta_{5N-9} + \delta_{5N-8} + \delta_{5N-7} + \delta_{5N-6}) \quad \text{Formula (3)}$$

In Formula (3), $\delta_{5N-15} \sim \delta_{5N-6}$ represent a plurality of motion values corresponding to two preceding intervals $\Delta T_{N-2}$ and $\Delta T_{N-1}$. In one equivalent embodiment, after the image input signal is identified as a film-mode signal, the dynamic threshold used in each interval is generated based on a plurality of motion values corresponding to at least one preceding intervals, and the related formula for generating the dynamic threshold can be inferred based on the aforementioned Formulas (2) and (3) by analogy.

Please continue referring to FIG. 3, the error rate in the generation of the JV values, based on the aforementioned dynamic-threshold processing mechanism, can be reduced significantly. Accordingly, the JV series generated is almost composed of the periodical film-mode cadence sequence repeatedly. However, parts of the JV values may be generated incorrectly due to a high motion value variation between adjacent intervals. For instance, because of a high motion value variation between adjacent intervals $\Delta T_3$ and $\Delta T_4$, the dynamic threshold THx4, generated based on the motion values corresponding to the interval $\Delta T_3$, is actually an improper threshold for use in the interval $\Delta T_4$, and therefore errors occur to the JV series generated in the interval $\Delta T_4$.

Figure 4:
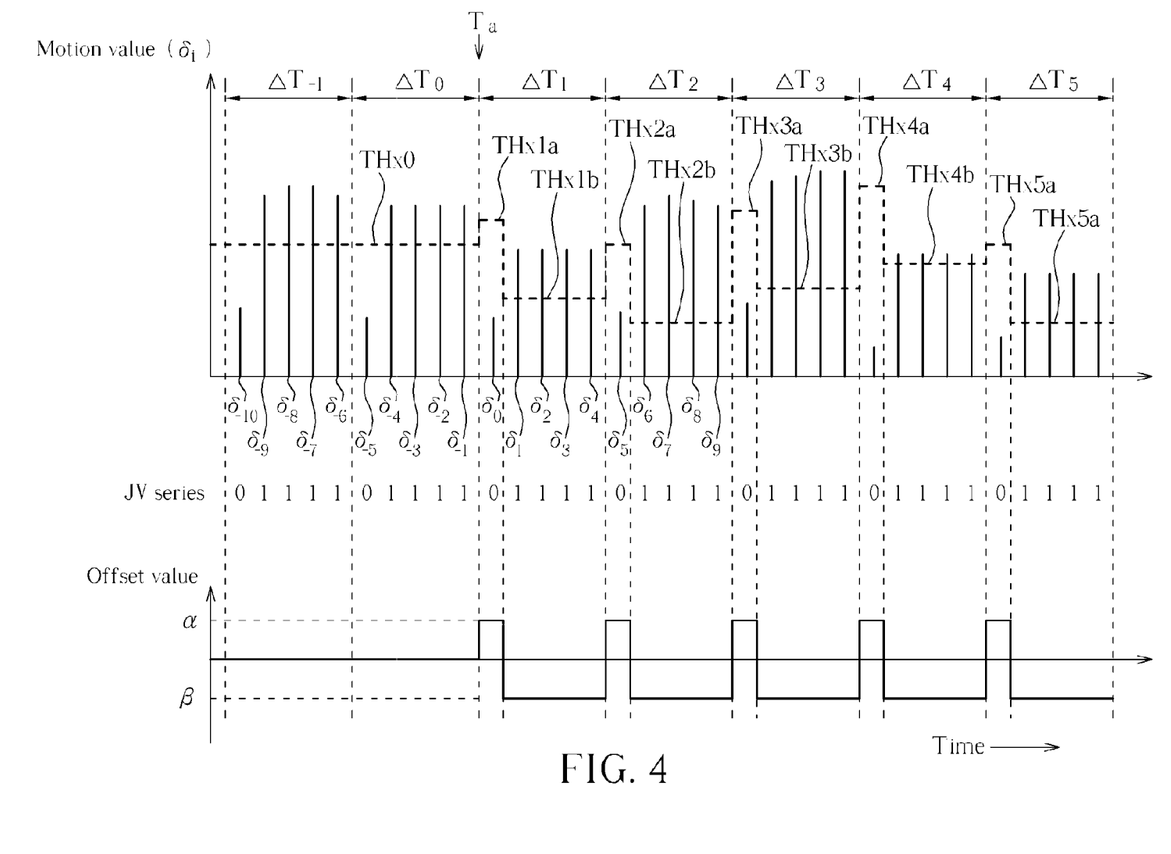
FIG. 4 is a schematic diagram showing a JV series generation method for use in a film-mode detection process in accordance with a second embodiment of the present invention, having time along the abscissa.

Please refer to FIG. 4, which is a schematic diagram showing a JV series generation method for use in a film-mode detection process in accordance with a second embodiment of the present invention, having time along the abscissa. All the motion values in FIG. 4 are identical to the motion values in FIG. 3. After the time Ta, i.e. after the image input signal is identified as a film-mode signal, the first dynamic threshold THxNa and the second dynamic threshold THxNb for use in the interval $\Delta T_N$ can be generated according to Formulas (4) and (5) expressed below.

$$THxNa = THxN + \alpha \qquad \text{Formula (4)}$$

$$THxNb = THxN + \beta \qquad \text{Formula (5)}$$

In Formulas (4) and (5), THxN represents a dynamic threshold generated based on Formula (2), Formula (3), or some other formula inferred by analog, $\alpha$ represents a first offset value, and $\beta$ represents a second offset value.

As shown in FIG. 4, during the interval $\Delta T_N$, the motion value having first order is compared with the first dynamic threshold THxNa for generating a corresponding JV value, and the motion values having other orders are compared with the second dynamic threshold THxNb for generating other corresponding JV values. For instance, during an interval $\Delta T_2$, the motion value $\delta_5$ having first order is compared with the first dynamic threshold THx2a for generating a corresponding JV value, and the motion values $\delta_6 \sim \delta_9$ having other orders are compared with the second dynamic threshold THx2b for generating other corresponding JV values.

The first offset value $\alpha$ and the second offset value $\beta$ are adjustable. If the first offset value $\alpha$ is positive and the second offset value $\beta$ is negative, the judge tolerance is increased so that an image-mode signal is unlikely to be misjudged as a video-mode signal. Accordingly, as shown in FIG. 4, regardless of the high motion value variation between adjacent intervals $\Delta T_3$ and $\Delta T_4$, the JV series during the interval $\Delta T_4$ is generated correctly due to the high judge tolerance increased by the first offset value $\alpha$ and the second offset value $\delta$. That is, an improper method of de-interlacing the image input signal can be avoided for retaining a high image display quality. However, the first offset value $\alpha$ and the second offset value $\beta$ are not limited to be positive and negative respectively and can be set to zero as described in the first embodiment.

In another embodiment, if some other periodical cadence sequence such as "01011", different from the film-mode cadence sequence, is used for determining signal mode, the dynamic threshold THxN regarding the interval $\Delta T_N$ can be generated according to some other Formula and is substituted into Formulas (4) and (5) for generating the first dynamic threshold THxNa and the second dynamic threshold THxNb. Then, the motion values having first and third orders are compared with the first dynamic threshold THxNa for generating two corresponding JV values, the motion values having other orders are compared with the second dynamic threshold THxNb for generating other corresponding JV values, and thus a JV series corresponding to the interval $\Delta T_N$ is generated. The JV series generated is then compared with the cadence sequence is "01011" for determining signal mode. To sum up, in the method of determining signal mode based on any periodical cadence sequence, a corresponding JV series can be generated via a dynamic threshold processing mechanism inferred by the aforementioned.

Figure 5:
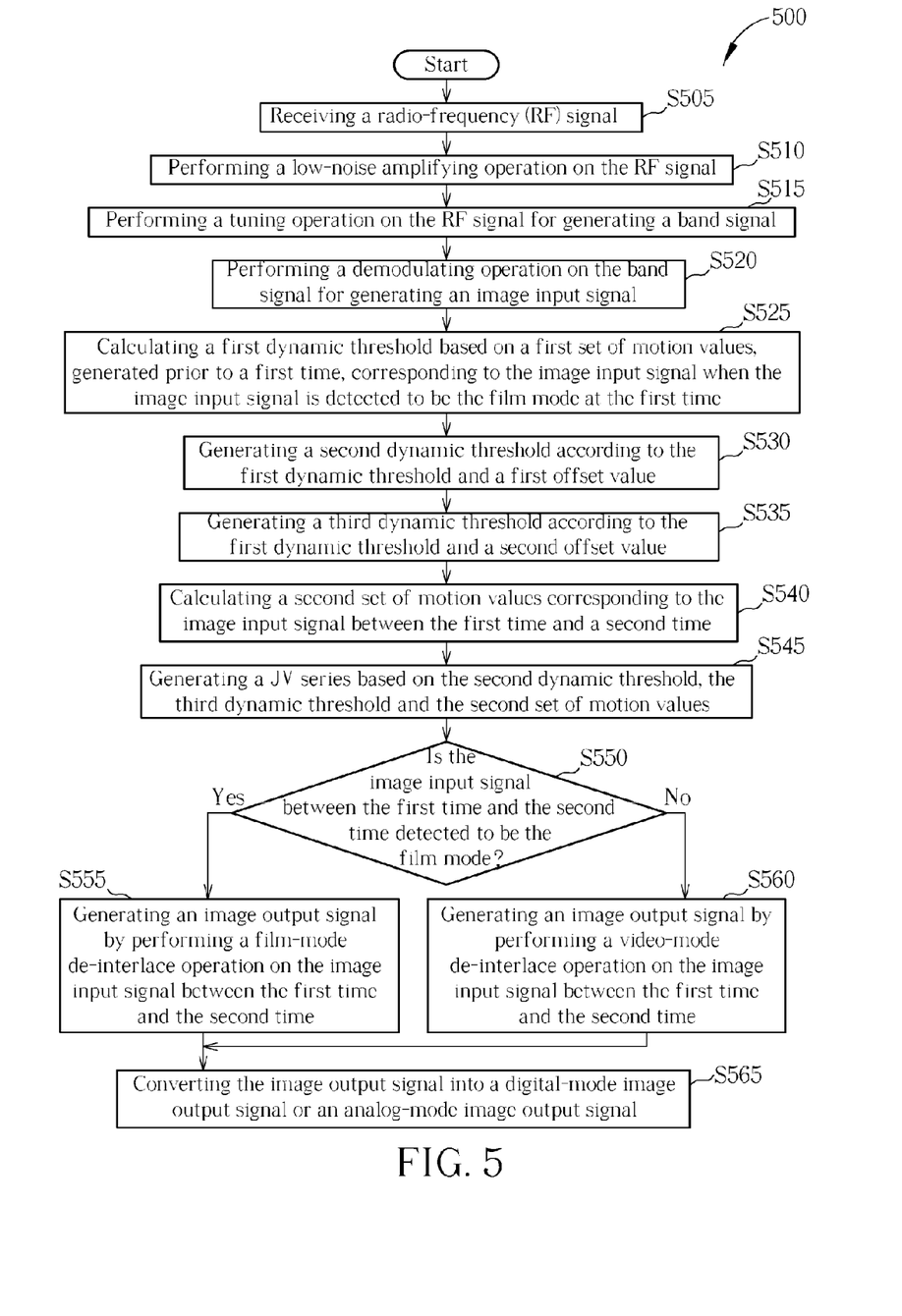
FIG. 5 presents a flowchart depicting an image signal processing method based on an offset processing mechanism according to the present invention.

Please refer to FIG. 5, which presents a flowchart depicting an image signal processing method based on an offset processing mechanism according to the present invention. As shown in FIG. 5, the image signal processing method 500 comprises the following steps:

Step S505: receiving a radio-frequency (RF) signal;

Step S510: performing a low-noise amplifying operation on the RF signal;

Step S515: performing a tuning operation on the RF signal for generating a band signal;

Step S520: performing a demodulating operation on the band signal for generating an image input signal;

Step S525: calculating a first dynamic threshold based on a first set of motion values, generated prior to a first time, corresponding to the image input signal when the image input signal is detected to be the film mode at the first time;

Step S530: generating a second dynamic threshold according to the first dynamic threshold and a first offset value;

Step S535: generating a third dynamic threshold according to the first dynamic threshold and a second offset value;

Step S540: calculating a second set of motion values corresponding to the image input signal between the first time and a second time;

Step S545: generating a JV series based on the second dynamic threshold, the third dynamic threshold and the second set of motion values;

Step S550: comparing the JV series with the film-mode cadence sequence for determining whether the image input signal between the first time and the second time is the film mode or the video mode, if the image input signal is detected to be the film mode, then go to step S555, otherwise go to step S560;

Step S555: generating an image output signal by performing a film-mode de-interlace operation on the image input signal between the first time and the second time;

Step S560: generating an image output signal by performing a video-mode de-interlace operation on the image input signal between the first time and the second time; and Step S565: converting the image output signal into a digital-mode image output signal or an analog-mode image output signal.

In the flow of the image signal processing method 500, the RF signal in step S505 is corresponding to a digital television or an analog television. The process of step S520 comprises performing the demodulating operation and an analog-to-digital conversion operation on the band signal for generating the image input signal. The first set of motion values in step S525 is calculated based on Formula (1). The process of step S525 comprises calculating the first dynamic threshold according to Formula (2) or (3). The process of step S530 comprises generating the second dynamic threshold by performing an addition operation on the first dynamic threshold and the first offset value. The process of step S535 comprises generating the third dynamic threshold by performing an addition operation on the first dynamic threshold and the second offset value. The first and second offset values are adjustable.

The second time in step S540 is behind the first time. The process of step S540 comprises calculating the second set of motion values according to Formula (1). The process of step S545 comprises comparing at least one motion value of the second set of motion values with the second dynamic threshold, and comparing the other motion values of the second set of motion values with the third dynamic threshold, for generating the JV series.

Figure 6:
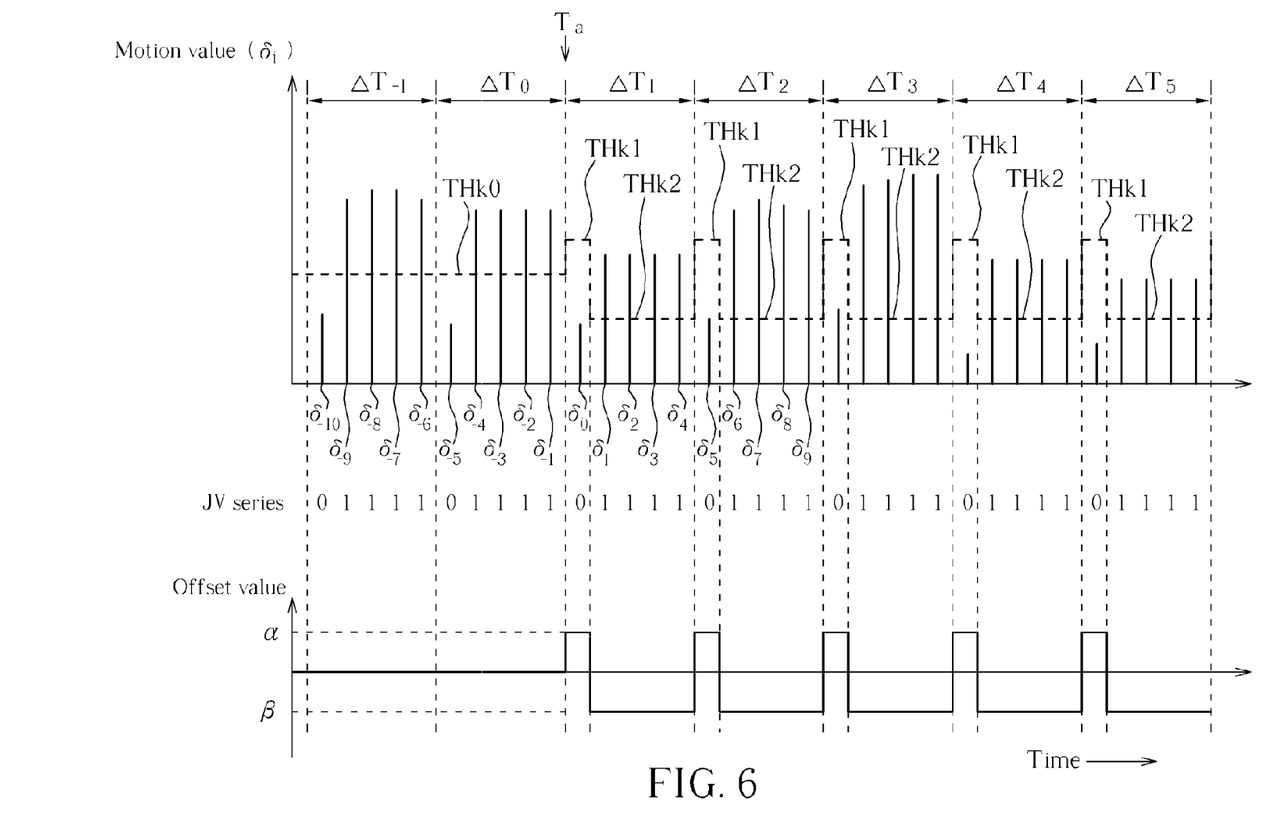
FIG. 6 is a schematic diagram showing a JV series generation method for use in a film-mode detection process in accordance with a third embodiment of the present invention, having time along the abscissa.

Please refer to FIG. 6, which is a schematic diagram showing a JV series generation method for use in a film-mode detection process in accordance with a third embodiment of the present invention, having time along the abscissa. All the motion values in FIG. 6 are identical to the motion values in FIG. 3. After the time Ta, i.e. after the image input signal is identified as a film-mode signal, the first threshold THk1 and the second threshold THk2 for use in the interval $\Delta T_N$ can be generated according to Formulas (6) and (7) expressed below.

$$THk1 = THkb + \alpha \quad \text{Formula (6)}$$

$$THk2 = THkb + \beta \quad \text{Formula (7)}$$

In Formulas (6) and (7), THkb represents a basic threshold, α represents a first offset value, and β represents a second offset value. In one embodiment, the basic threshold THkb is a preliminary threshold THk0 used prior to the time Ta. That is, in the JV series generation method shown in FIG. 6, the first threshold THk1 and the second threshold THk2 are generated directly based on the preliminary threshold THk0 in conjunction with the first offset value α and the second offset value β respectively. In other words, the first threshold THk1 and the second threshold THk2 can be generated prior to the time Ta, and the JV series, corresponding to each interval $\Delta T_N$ after the time Ta, is generated by comparing corresponding motion values with the first threshold THk1 and the second threshold THk2 directly. Referring to FIG. 6, as long as the first offset value α is positive and the second offset value β is negative, the judge tolerance is increased so that the JV series, corresponding to each interval $\Delta T_N$ after the time Ta, can be generated correctly for avoiding signal-mode misjudgment.

In another embodiment, the basic threshold THkb is the dynamic threshold THx1 generated based on Formula (2) or (3) during the interval $\Delta T_1$. In view of that, the first threshold THk1 and the second threshold THk2 are generated during the interval $\Delta T_1$ based on the dynamic threshold THx1 in conjunction with the first offset value α and the second offset value β respectively, and the JV series, corresponding to each interval $\Delta T_N$ after the time Ta, is generated by comparing corresponding motion values with the first threshold THk1 and the second threshold THk2 generated during the interval $\Delta T_1$.

In summary, the image signal processing method of the present invention can be put in use for performing a film-mode detection process, and the JV series can be generated correctly regardless of a high motion value variation between adjacent intervals so that an improper method of de-interlacing the image input signal is avoided for retaining a high image display quality. Furthermore, the signal-mode judgment method, based on the offset processing mechanism provided by the present invention, can be put in use for judging an image signal or a circuit signal having signal values changing periodically in a certain mode. That is, with the aid of a positive offset and a negative offset for shifting up a threshold for judging low-level signals and shifting down another threshold for judging high-level signals, the judge tolerance can be increased; besides, the judge accuracy can be enhanced by making use of the aforementioned dynamic-threshold processing mechanism.

The present invention is by no means limited to the embodiments as described above by referring to the accompanying drawings, which may be modified and altered in a variety of different ways without departing from the scope of the present invention. Thus, it should be understood by those skilled in the art that various modifications, combinations, sub-combinations and alternations might occur depending on design requirements and other factors insofar as they are within the scope of the appended claims or the equivalents thereof.

What is claimed is:

1. A method of image signal processing comprising:
   calculating a first threshold based on a first set of motion values, generated prior to a first time, corresponding to an image input signal when the image input signal is detected to be a film mode at the first time;
   generating a second threshold according to the first threshold and a first offset value;
   generating a third threshold according to the first threshold and a second offset value;
   calculating a second set of motion values corresponding to the image input signal between the first time and a second time;
   comparing at least one motion value of the second set of motion values with the second threshold, and comparing remaining motion values of the second set of motion values with the third threshold, for generating a field variation judge value series; and
   comparing the field variation judge value series with a film-mode cadence sequence for determining whether the image input signal between the first time and the second time is the film mode or a video mode;
   wherein the second time is behind the first time.

2. The method of claim 1, wherein the first offset value and the second offset value are adjustable, and the first set of motion values comprises a plurality of consecutive motion values.

3. The method of claim 1, wherein calculating the first threshold based on the first set of motion values is calculating the first threshold according to the following formula:

$$THx1 = \frac{\delta_1}{2} + \frac{1}{8}(\delta_2 + \delta_3 + \delta_4 + \delta_5)$$

where THx1 represents the first threshold, $\delta_1$ represents a first motion value of the first set of motion values, $\delta_2$ represents a second motion value of the first set of motion values, $\delta_3$ represents a third motion value of the first set of motion values, $\delta_4$ represents a fourth motion value of the first set of motion values, and $\delta_5$ represents a fifth motion value of the first set of motion values.

4. The method of claim 1, wherein calculating the first threshold based on the first set of motion values is calculating the first threshold according to the following formula:

$$THx1 = \frac{\delta_1}{4} + \frac{1}{16}(\delta_2 + \delta_3 + \delta_4 + \delta_5) + \frac{\delta_6}{4} + \frac{1}{16}(\delta_7 + \delta_8 + \delta_9 + \delta_{10})$$

where THx1 represents the first threshold, $\delta_1$ represents a first motion value of the first set of motion values, $\delta_2$ represents a second motion value of the first set of motion values, $\delta_3$ represents a third motion value of the first set of motion values, $\delta_4$ represents a fourth motion value of the first set of motion values, $\delta_5$ represents a fifth motion value of the first set of motion values, $\delta_6$ represents a sixth motion value of the first set of motion values, $\delta_7$ represents a seventh motion value of the first set of motion values, $\delta_8$ represents an eighth motion value of the first set of motion values, $\delta_9$ represents a ninth motion value of the first set of motion values, $\delta_{10}$ represents a tenth motion value of the first set of motion values.

5. The method of claim 1, wherein an ith motion value of the first set of motion values is calculated according to the following formula:

$$\delta_i = \sum_{j=1}^{N} (|R_i^j - R_{i+2}^j| + |G_i^j - G_{i+2}^j| + |B_i^j - B_{i+2}^j|)$$

Where $\delta_i$, represents the ith motion value, j represents a serial number of an image pixel in a field, N represents a number of image pixels in the field, $R_i^j$ represents a red pixel value of a jth pixel in an ith field, $R_{i+2}^j$ represents a red pixel value of a jth pixel in a (i+2)th field, $G_i^j$ represents a green pixel value of the jth pixel in the ith field, $G_{i+2}^j$ represents a green pixel value of the jth pixel in the (i+2)th field, $B_i^j$ represents a blue pixel value of the jth pixel in the ith field, and $B_{i+2}^j$ represents a blue pixel value of the jth pixel in the (i+2)th field.

6. The method of claim 1, wherein:
the second threshold is generated by performing an addition operation on the first threshold and the first offset value; and
the third threshold is generated by performing an addition operation on the first threshold and the second offset value.

7. The method of claim 6, wherein the first offset value is positive and the second offset value is negative.

8. The method of claim 1, wherein the process of comparing the field variation judge value series with the film-mode cadence sequence for determining whether the image input signal between the first time and the second time is the film mode or the video mode comprises:
determining that the image input signal between the first time and the second time is the film mode when the field variation judge value series is identical to the film-mode cadence sequence.

9. The method of claim 1, further comprising:
receiving a radio-frequency (RF) signal; and
performing a tuning operation and a demodulating operation on the RF signal for generating the image input signal.

10. The method of claim 9, wherein the process of performing the tuning operation and the demodulating operation on the RF signal for generating the image input signal comprises:
performing the tuning operation on the RF signal for generating a band signal; and
performing the demodulating operation on the band signal for generating the image input signal.

11. The method of claim 1, further comprising:
performing a film-mode de-interlace operation on the image input signal between the first time and the second time when the image input signal between the first time and the second time is the film mode;
performing a video-mode de-interlace operation on the image input signal between the first time and the second time when the image input signal between the first time and the second time is the video mode; and
generating an image output signal based on the film-mode or video-mode de-interlace operation.

* * * * *